(12) United States Patent
Lee et al.

(10) Patent No.: US 11,932,312 B2
(45) Date of Patent: Mar. 19, 2024

(54) TAIL EXTENSION FOR A TRUCK BED

(71) Applicant: Caterpillar Inc., Peoria, IL (US)

(72) Inventors: One Chul Lee, Peoria, IL (US); Timothy James Bromenshenkel, Tuscola, IL (US)

(73) Assignee: Caterpillar Inc., Peoria, IL (US)

( * ) Notice: Subject to any disclaimer, the term of this patent is extended or adjusted under 35 U.S.C. 154(b) by 72 days.

(21) Appl. No.: 17/548,421

(22) Filed: Dec. 10, 2021

(65) Prior Publication Data

US 2023/0182830 A1 Jun. 15, 2023

(51) Int. Cl.
*B62D 33/023* (2006.01)

(52) U.S. Cl.
CPC .................. *B62D 33/023* (2013.01)

(58) Field of Classification Search
CPC ......... B62D 33/02; B62D 33/023; B60P 1/28; B60P 1/283
USPC .................. 298/7, 17 R; 296/26.08, 183.2
See application file for complete search history.

(56) References Cited

U.S. PATENT DOCUMENTS

| | | | | | |
|---|---|---|---|---|---|
| 4,884,838 | A | * | 12/1989 | Slater | B62D 35/007 296/180.1 |
| 5,372,397 | A | * | 12/1994 | Arndt | B62D 29/001 296/57.1 |
| 5,732,995 | A | * | 3/1998 | Piccariello | B60P 1/435 296/57.1 |
| 5,775,759 | A | | 7/1998 | Cummins | |
| 7,100,256 | B2 | * | 9/2006 | D'Amico | B60P 3/42 29/401.1 |
| 7,481,483 | B2 | * | 1/2009 | D'Amico | B62D 33/02 296/183.1 |
| D596,077 | S | * | 7/2009 | Bryant | D12/15 |
| 7,699,373 | B2 | * | 4/2010 | Miller | B60P 3/40 296/50 |
| D647,001 | S | * | 10/2011 | Rajderkar | D15/10 |
| 8,708,391 | B2 | * | 4/2014 | Dunn | B60R 13/01 296/39.2 |
| 9,216,680 | B2 | * | 12/2015 | Hagenbuch | B62D 25/2054 |
| 9,321,385 | B2 | * | 4/2016 | Annetts | B60P 1/286 |
| 11,286,009 | B2 | * | 3/2022 | DeSimone | B62D 29/008 |
| 11,400,848 | B2 | * | 8/2022 | Arul | B60P 1/286 |

(Continued)

FOREIGN PATENT DOCUMENTS

| | | |
|---|---|---|
| CA | 2468025 | 5/2003 |
| JP | 2009190630 A | 8/2009 |

(Continued)

OTHER PUBLICATIONS

Written Opinion and International Search Report for Int'l. Patent Appln. No. PCT/US2022/050826, dated Mar. 13, 2023 (10 pgs).

*Primary Examiner* — Amy R Weisberg
*Assistant Examiner* — Sara Laghlam

(57) ABSTRACT

An extension for a truck bed may include a main extension flap configured to overlap a top surface of the truck bed and extend rearwardly beyond a rear edge of the truck bed and a lower reinforcing flap configured for arrangement below the truck bed and extending rearwardly and upwardly to support the main extension flap, wherein the main extension flap and the lower reinforcing flap are configured to form a removable sandwich connection on the rear edge of the truck bed.

20 Claims, 7 Drawing Sheets

(56) References Cited

U.S. PATENT DOCUMENTS

2007/0261181 A1* 11/2007 Willard .................. B60P 1/435
                                                                                                   14/71.1
2016/0214657 A1* 7/2016 Topolovec ........... B62D 33/027
2020/0398727 A1 12/2020 Hallevall et al.

FOREIGN PATENT DOCUMENTS

JP           4862839       11/2011
WO   WO-2009042573 A1 * 4/2009 ......... B62D 33/0273

\* cited by examiner

202 — Slipping a tail extension over the rear edge of the dump body
- suspending the tail extension
- guiding the tail extension toward the dump body
- adjusting the position of the tail extension to align the rear edge of the dump body with a gap between the main extension flap and the flared front edge of the lower reinforcing flap
- adjusting the tail extension side to side to align the tiebacks with the outboard edges of the dump body
  - advancing the tail extension in a forward direction aligning the holes in the tail extension with the holes in the dump body 204 — Removably attaching the tail extension to the dump body
- inserting fasteners into the holes in the bottom of the lower reinforcing flap
- advancing them upward through the dump body and into the main extension flap
- inserting the fasteners into the threaded bores of the thread blocks
- tightening the fasteners
- inserting fasteners through the tie-backs into the sidewalls of the dump body 206 — Reversing the operation to remove the tail extension

FIG. 12

TAIL EXTENSION FOR A TRUCK BED

TECHNICAL FIELD

The present application relates generally to a removable extension for a truck bed. More particularly, the present application relates to a removable extension for an articulating truck bed or dump body. Still more particularly, the present application relates to tail extension for a dump body that is reinforced to withstand loading and impact and that is bolted to the dump body such that it may be attached or removed depending on work conditions.

BACKGROUND

Haul trucks may be used to haul rock, gravel, sand, or other mined material along a haul road from a mined location to a processing location, a shipping location, or other secondary location. For example, haul trucks may commonly be used in quarries where rock is being mined in one location and processed or shipped out of the quarry at another location. The haul trucks may have very large weight and volume capacities to allow for transporting large amounts of material. In some cases, haul trucks may have truck beds in the form of dump bodies that have a deep belly near the center of the vehicle that slopes upward as the bottom of the dump body extends toward the back of the vehicle. The dump body may have tall sides on either side of the deep belly and a top edge of the sides may be relatively flat or horizontal relative to the vehicle as the dump body extends toward the back of the vehicle. As such, the dump body may get gradually shallower as it extends rearward. For purposes of efficient loading and unloading, the dump body may often not include a tail gate or a cover. Rather, the dump body may include an open back and the upward sloping bottom of the dump body may help to maintain the load within the dump body when travelling along a haul road. In some circumstances, the load may be more prone to escaping out the back of the dump body. For example, when relatively steep inclines are encountered, the upward sloping bottom of the dump body may become more horizontally oriented relative to gravitational forces and, as such, material may escape. In other situations, relatively uneven or bumpy haul roads may contribute to material escape.

Japanese Patent 4,862,839 relates to a freight vehicle equipped with a packing box. In one example therein, a freight vehicle includes a vehicle main body and a packing box mounted on the vehicle main body. The packing box has a low floor portion at a rear portion, wherein the vehicle main body and the low floor portion are fixedly attached, and a plunge prevention device is provided.

SUMMARY

In one or more examples, an extension for a truck bed may include a main extension flap configured to overlap a top surface of the truck bed and extend rearwardly beyond a rear edge of the truck bed. The extension may also include a lower reinforcing flap configured for arrangement below the truck bed and extending rearwardly and upwardly to support the main extension flap. The main extension flap and the lower reinforcing flap may be configured to form a removable sandwich connection on the rear edge of the truck bed.

In one or more examples, a truck bed for a haul truck may include a bottom, a front wall, and a pair of sidewalls. The truck bed may also include an extension. The extension may include a main extension flap configured to overlap a top surface of the truck bed and extend rearwardly beyond a rear edge of the truck bed. The extension may also include a lower reinforcing flap configured for arrangement below the truck bed and extending rearwardly and upwardly to support the main extension flap. The main extension flap and the lower reinforcing flap may be configured to form a removable sandwich connection on the rear edge of the truck bed.

In one or more examples, a method of installing a tail extension on a truck bed may include slipping a tail extension over a rear edge of the truck bed to sandwich the truck bed with a main extension flap and a lower reinforcing flap of the tail extension. The method may also include inserting fasteners through the lower reinforcing flap, through the truck bed, and through the main extension flap into thread blocks on a top side of the main extension flap. The method may also include tightening the fasteners.

DESCRIPTION OF THE DRAWINGS

FIG. 12 is a diagram depicting a method of installation and/or removal of the tail extension of FIGS. 4-9 and 11.

DETAILED DESCRIPTION

Figure 1:
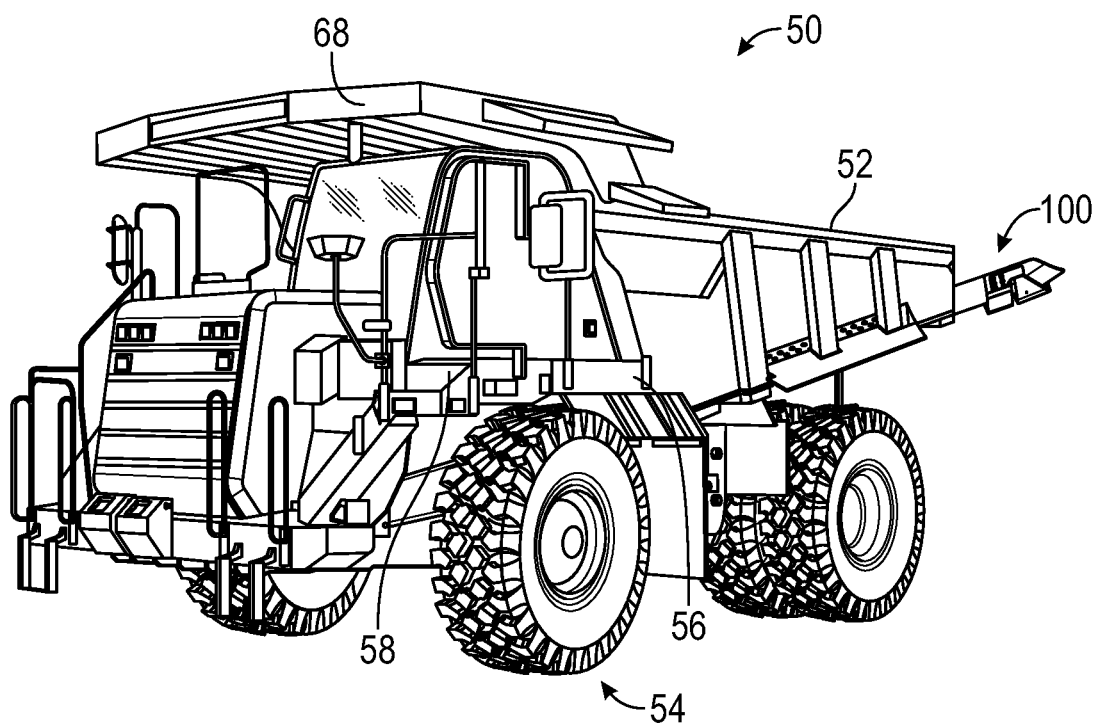
FIG. 1 is a front and side perspective view of a haul truck with a truck bed having a tail extension, according to one or more examples.

FIG. 1 is a front and side perspective view of a haul truck 50 with a truck bed 52 having a tail extension 100, according to one or more examples. As shown, the haul truck 50 may be configured to be loaded with material and to carry the material from a mined or other retrieval location to a processing location along a haul road. The haul truck 50 may include a ground engaging element 54 such as a track or wheel system 54 and a frame 56 supported off of the ground engaging element 54 by a suspension. The frame 56 may support an engine, an electric motor (e.g., for trolley driving), and a drive train extending from the engine/motor to the ground engaging element 54. A truck bed 52 may be provided for holding and carrying cargo and a tail extension 100 may be provided thereon. A cab or other operator station 58 may be provided and/or a remote-control receiving station may be provided. In addition, a control system or device such as an electronic control module or other computing device may be provided for receiving user commands and controlling the haul truck 50 accordingly, or automated operations may be performed by the control system.

Figure 2:
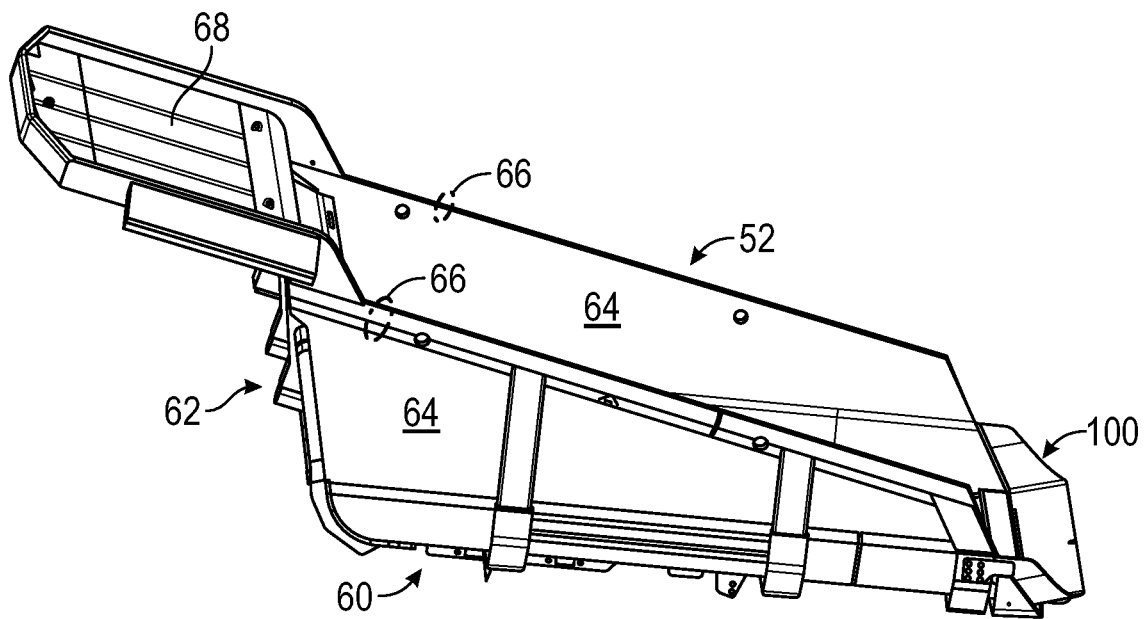
FIG. 2 is a side perspective view of the truck bed and tail extension of the haul truck of FIG. 1, according to one or more examples.
Figure 3:
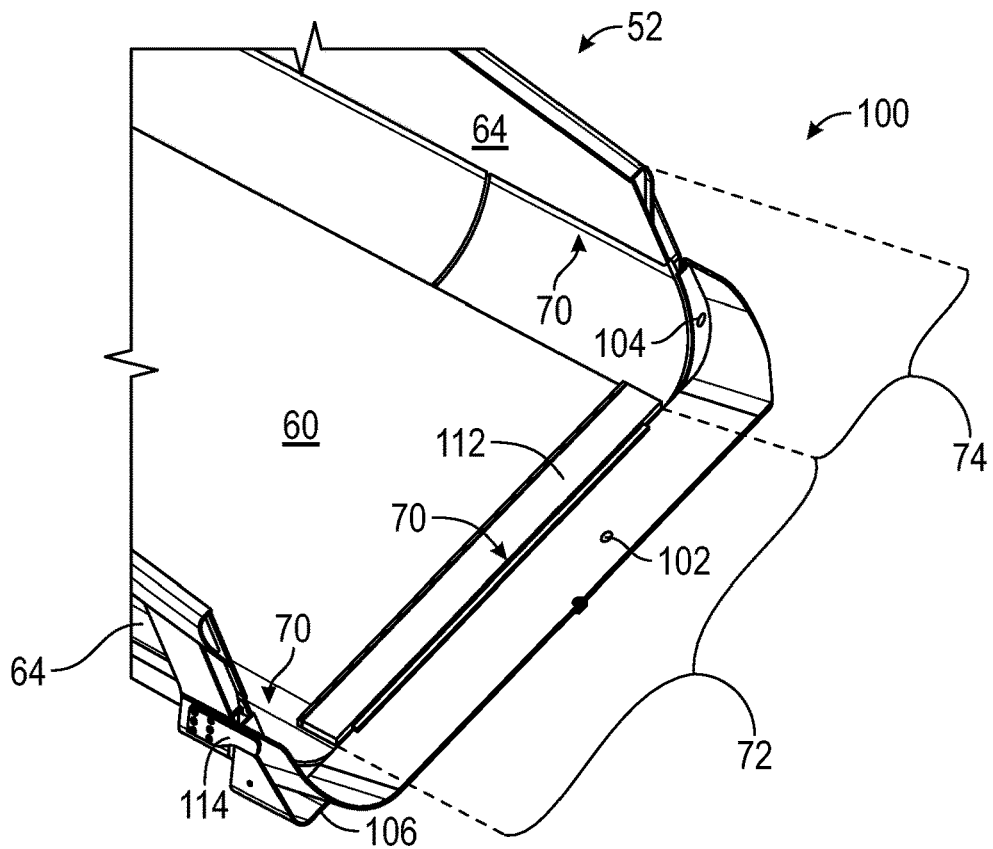
FIG. 3 is a partial rear perspective view thereof.

With reference to FIG. 2, the truck bed 52 may be in the form of a dump body. That is, the truck bed 52 may be adapted for tipping relative to the frame 56 to allow a load to be dumped from the truck bed 52. The dump body may be configured for receiving and holding excavated material such as rock, sand, gravel or debris, or other material and carrying the material from one location to another. The dump body may include a bottom 60, a front wall 62, and two sidewalls 64. The bottom 60, front wall 62, and two sidewalk 64 may define a substantially deep belly near a front of the dump body and the bottom 60 and top edges 66 of the sidewalls 64 may converge as they each extend toward a rear end of the dump body. When arranged on a haul truck 50, the bottom 60 of the dump body may slope upward relative to the frame 56 of the haul truck 50 as it extends from the deep belly toward the rear of the haul truck 50. In contrast, the top edges 66 of the sidewalls 64 may be arranged generally horizontally relative to the truck frame 56 as they extend rearward. As shown, a cab guard 68 may extend forward from the front wall 62 to provide overhead protection to the cab 58 of the haul truck 50. The dump body may be constructed of a reinforcing frame lined with a bed liner such as a steel or other metal liner bridging across and covering the reinforcing frame and forming the interior surface of the dump body. As shown in FIG. 3, the liner may include a rear edge 70 extending across the rear of the dump body along the bottom and upward extending sides of the dump body. That is, the rear edge 70 may include a bottom portion 72 arranged along the rear of the bottom 60 of the dump body and two side portions 74 extending along the rear of the upward extending sides 64. As shown, a tail extension 100 may be provided along the rear edge 70 of the dump body.

Figure 4:
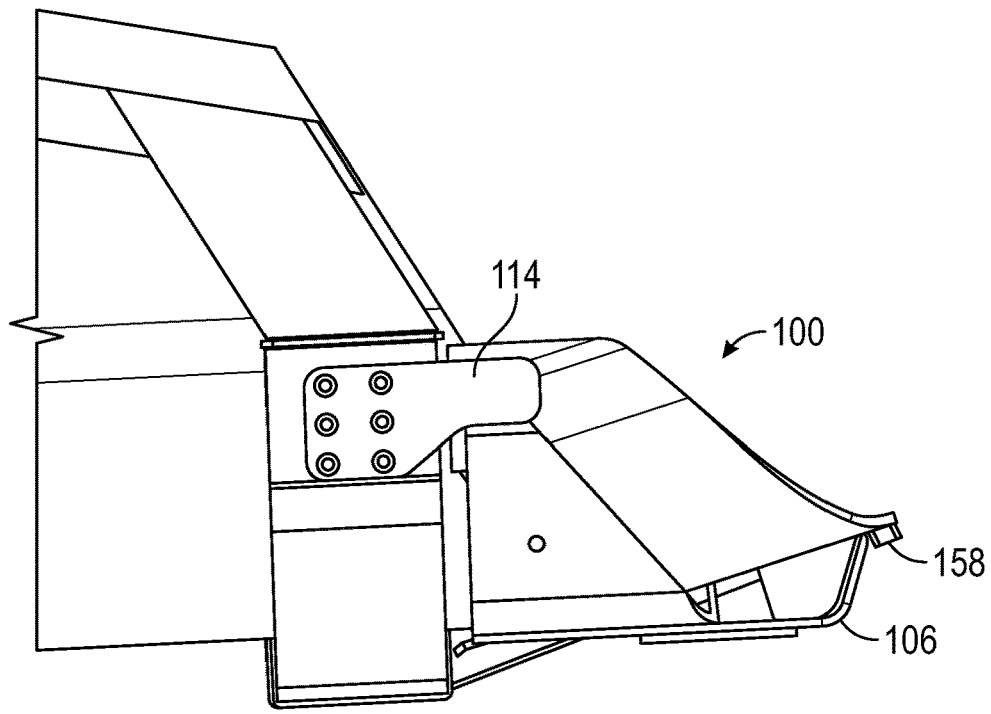
FIG. 4 is a close-up side view of the tail extension of FIGS. 1-3, according to one or more examples.

Turning now to FIGS. 3 and 4, the tail extension 100 is shown. The tail extension may be configured to extend the bottom 60 and a portion of the sidewalk 64 of the dump body slightly, but also to contain material being held and/or hauled by the dump body. To that end, the tail extension 100 may provide an upward sloping surface relative to the bottom 60 of the dump body and along the rear edge 70 of the bottom 60 of the dump body. The upward sloping surface may interrupt and/or arrest material that may slide, roll, or tumble toward the rear edge 70 of the dump body and which may otherwise fall from the rear edge 70 of the dump body. As such, the tail extension 100 may function to contain material within the dump body, particularly when the haul truck is climbing relatively steep grades, for example. As shown in more detail in FIGS. 5-11, the tail extension 100 may include a main extension flap 102 with edge ribs 104, a lower reinforcing flap 106, a stiffening system 108 (see FIG. 7), a fastening system 110 (see FIG. 6), a wear resisting system 112, and one or more tie-back tabs 114.

Figure 8:
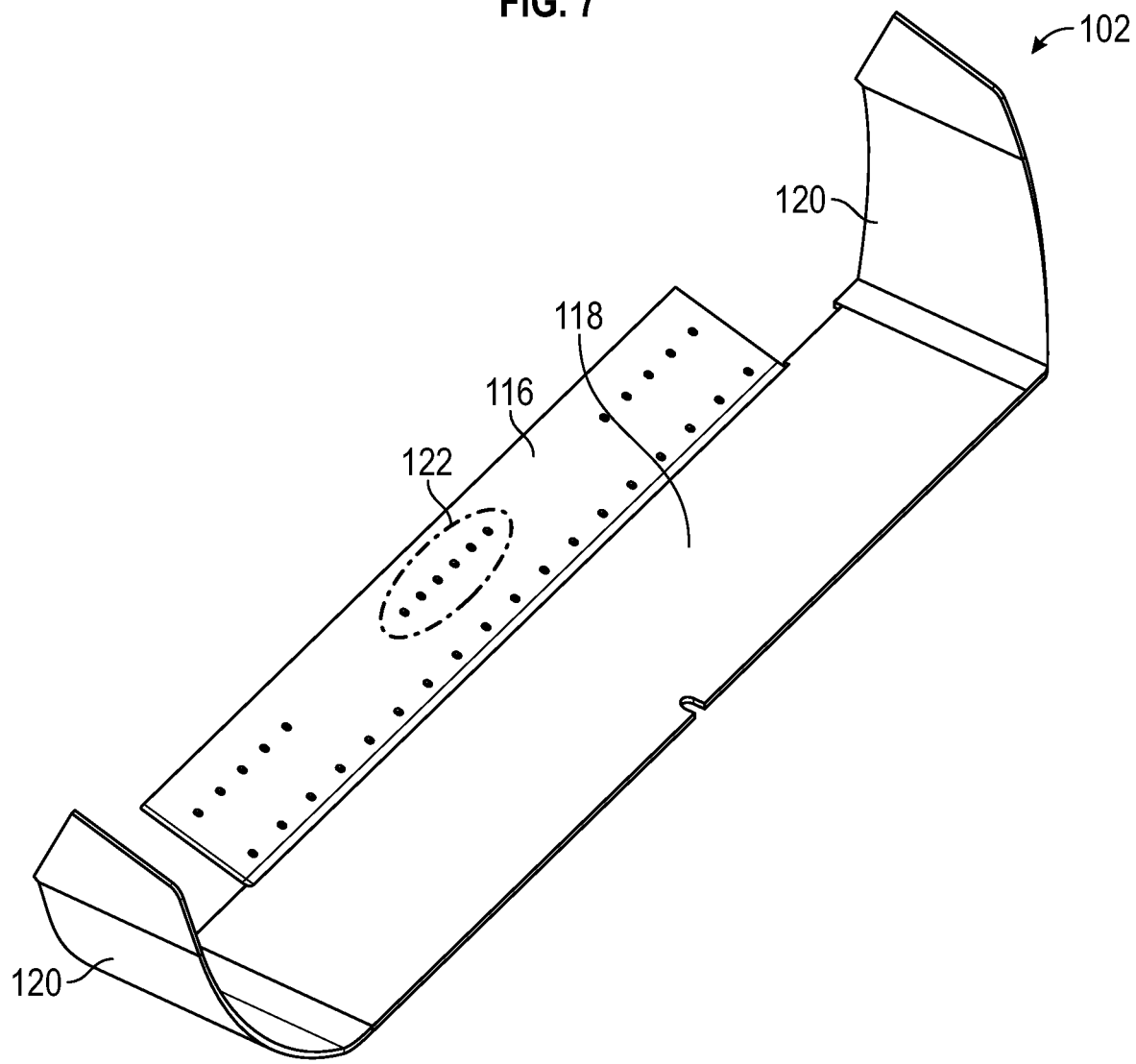
FIG. 8 is an isolated view of a main extension flap of the tail extension of FIGS. 4-7, according to one or more examples.

The main extension flap 102 is shown in isolation in FIG. 8. As shown, the main extension flap may be configured as the main functioning portion of the tail extension with respect to the material in the dump body. That is, the main tail extension may interact with the material in the dump body, particularly if the material slides, rolls, or tumbles in a rearward direction and may function to resist or arrest rearward motion of the material. The main extension flap 102 may include an attachment portion 116, a central portion 118, and a pair of upward extending returns 120.

The attachment portion 116 may be configured for placement on a top surface of the bottom 60 of the truck bed 52 along the rear edge 70 of the dump body and may be further configured for attaching the main extension flap 102 to the dump body. The attachment portion 116 may include a generally flat plate-like element that is adapted to rest generally continuously or fully on the bottom portion 72 of the rear edge 70 of the bottom 60 of the dump body. As shown, the attachment portion 116 may be substantially rectangular in shape and may extend substantially the full distance across the width of the bottom 60 of the dump body and extend into the bed of the dump body a short distance. The attachment portion 116 may include a plurality of holes 122 configured to received fasteners from below the dump body.

Figure 9:
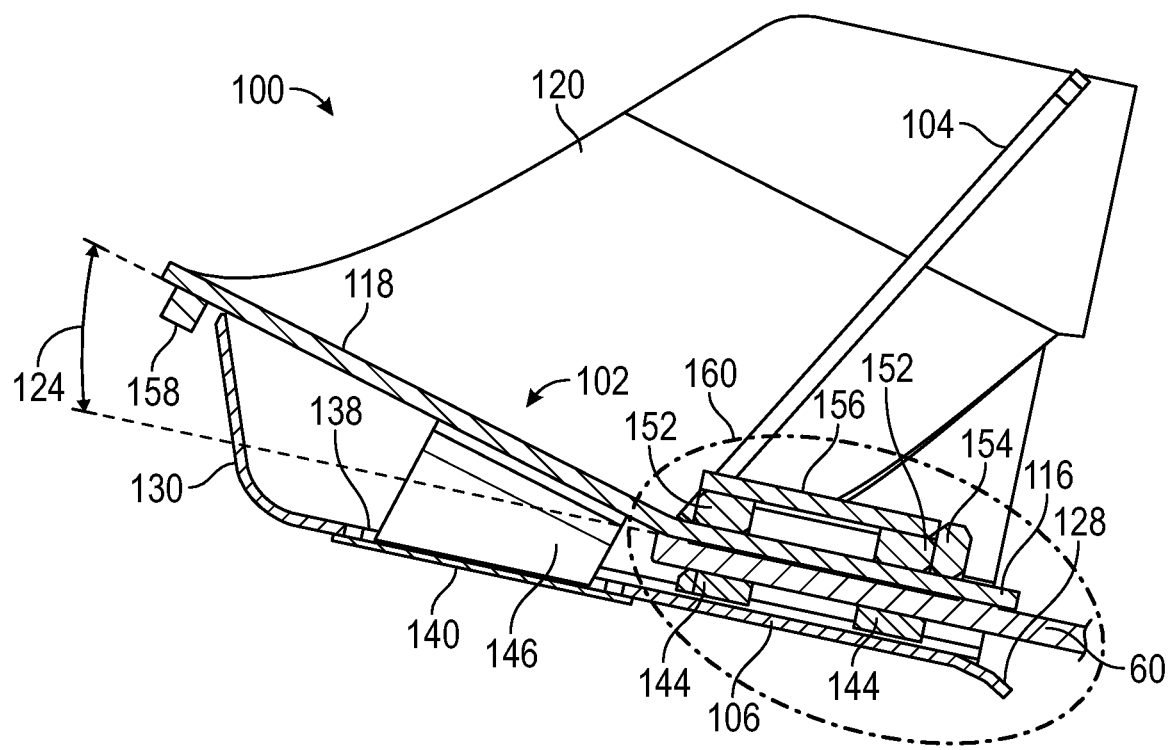
FIG. 9 is a cross-sectional view of the tail extension of FIGS. 4-7, according to one or more examples.

The central portion 118 of the main extension flap 102 may be a relatively wide plate-like and generally flat element extending generally fully across the bottom portion 72 of the rear edge 70 of the dump body (e.g., beyond the outer edges of the attachment portion 116). In one or more examples, the central portion 118 may have a width slightly larger than the width of the bottom portion 72 of the rear edge 70 of the dump body. The central portion 118 may also extend a short distance rearward and away from the rear edge 70 of the dump body. As shown in FIG. 9, the central portion may be arranged at an upward angle 124 relative to the attachment portion 116 and, as such, may provide the mentioned upward sloping surface because with the attachment portion 116 resting on the bottom 60 of the dump body, the central portion 118 may be arranged at an upward angle relative to the bottom 60 of the dump body.

The main extension flap 102 may also include upward extending returns 120 at each side of the central portion 118 that mimic the contour of the transition between the bottom 60 and the sidewalls 64 of the dump body, but are arranged slightly outside the sidewalls 64 of the dump body. These upward extending returns may initially extend laterally outward from the central portion 118 of the main extension flap 102 and may curve upward to mimic the contour of the transition in the dump body.

Figure 5:
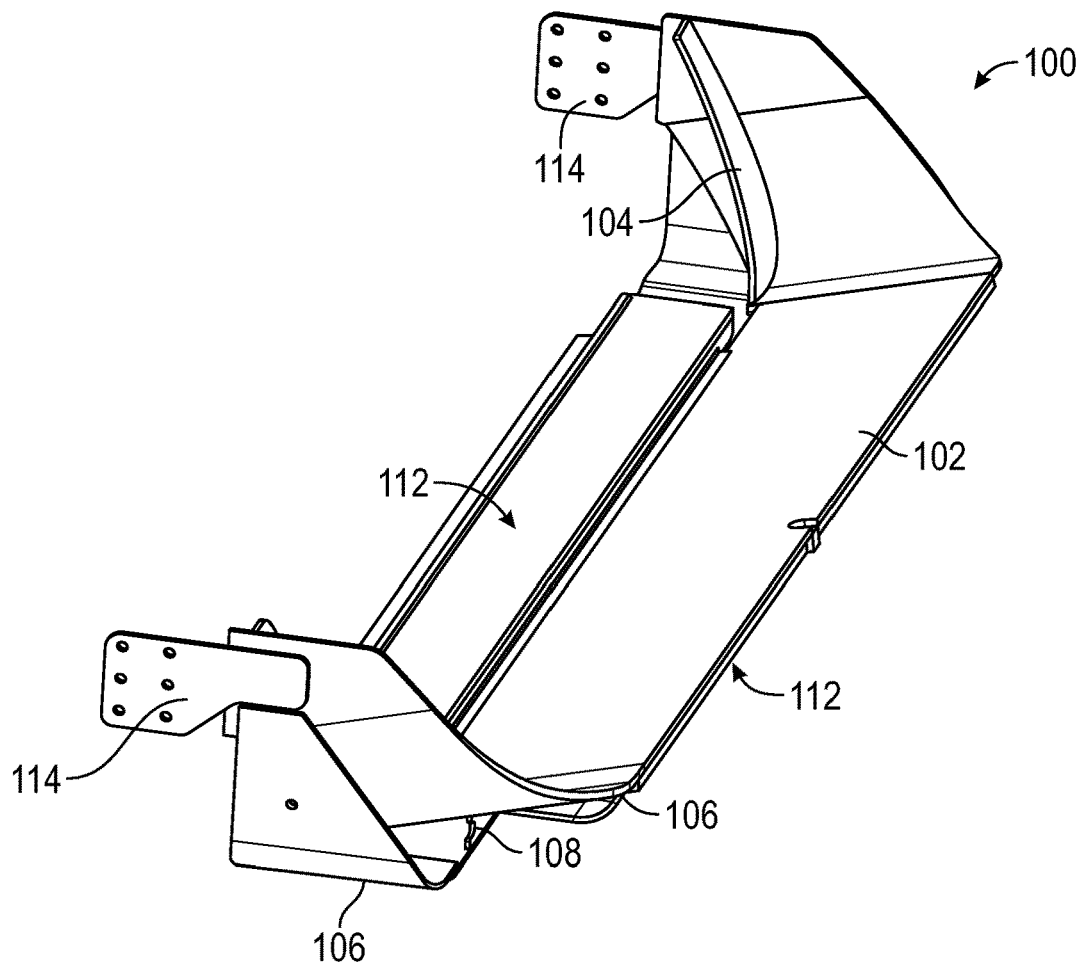
FIG. 5 is an isolated rear and side perspective view thereof.
Figure 6:
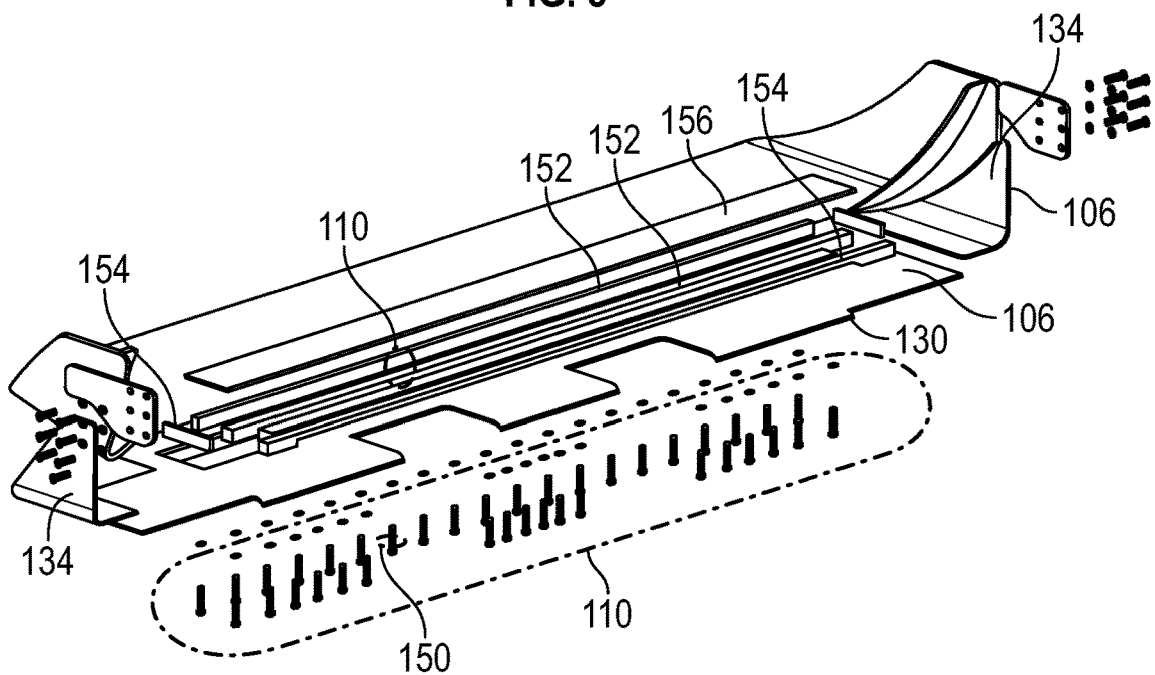
FIG. 6 is a front and side perspective exploded view thereof.

One or more edge ribs 104 may be provided on the main extension flap 102 as shown, for example, in the FIGS. 3, 5, and 6. The edge rib or ribs 104 may be configured to close any gap between the side portions 74 of the rear edge 70 of the dump body and the upward extending returns 120 on the main extension flap 102. That is, as discussed, Where the central portion 118 of the main extension flap 102 extends further outboard than the bottom portion 72 of the rear edge 70 of the dump body, the upward extending returns 120 may be arranged outboard of the side portions 74 of the rear edge 70 of the dump body (or at least outboard of the inside surface of the sides 64). The edge ribs 104 may function to close any resulting gap between the side portions 74 of the rear edge 70 of the dump body and the upward extending returns 120. Moreover, the edge ribs 104 may function to stiffen the upward extending returns 120 of the main extension flap 102. As shown, the edge ribs 104 may include substantially plate-like elements having a crescent shape when viewed from the rear of the haul truck 50 or the rear of the extension flap 100. The outer edge of the rib 104 may conform with and/or match the contour of the transition between the central portion 118 and the upward extending returns 120 on the main extension flap 102. The edge ribs 104 may be welded or otherwise secured to the main extension flap 102.

Figure 7:
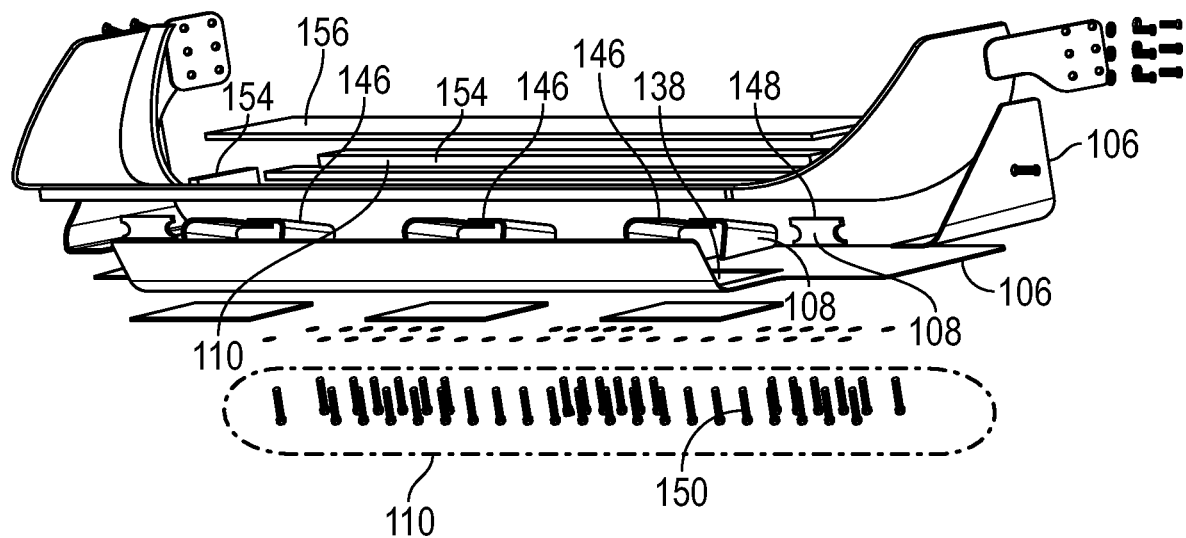
FIG. 7 is a rear and side perspective exploded view thereof.
Figure 10:
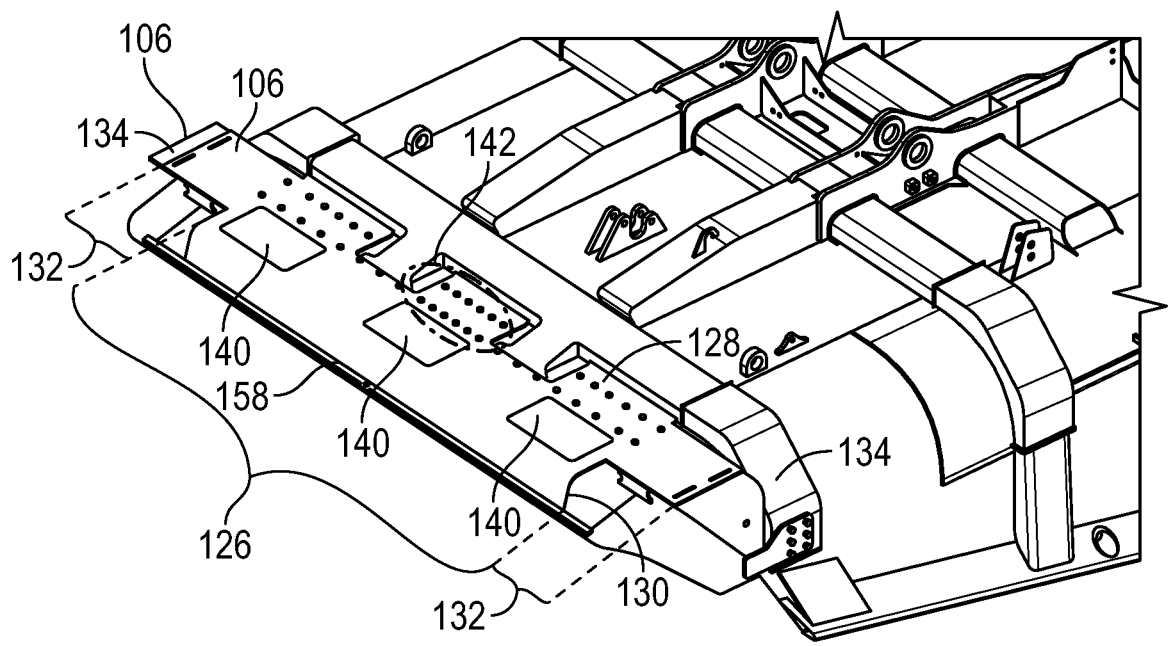
FIG. 10 is a bottom and side perspective view of the tail extension of FIGS. 4-9 arranged on a dump body, according to one or more examples.
Figure 11:
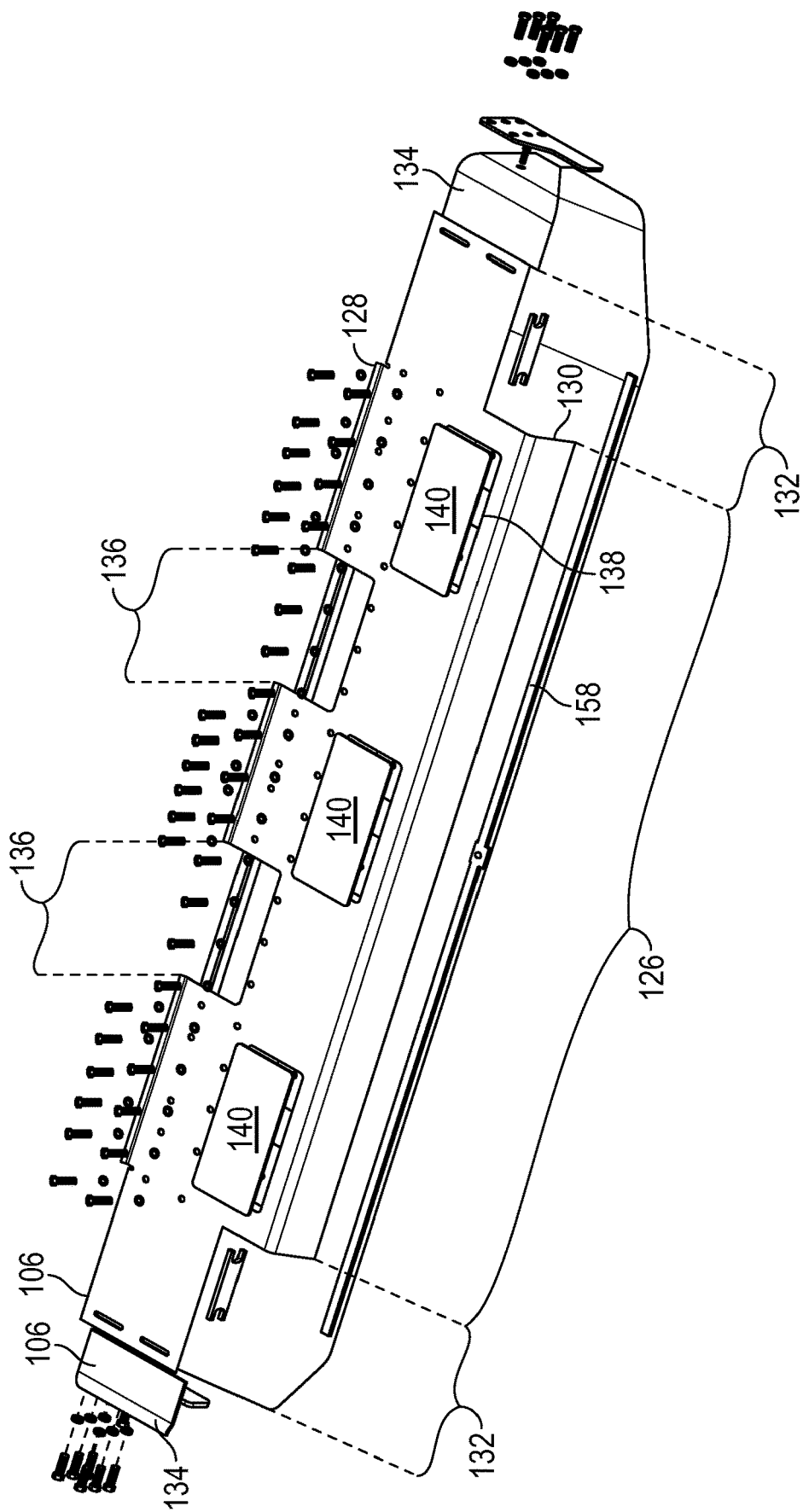
FIG. 11 is a bottom and side perspective exploded view of the tail extension of FIGS. 4-9, according to one or more examples.

The lower reinforcing flap 106 is shown in top perspective views in FIGS. 6 and 7, a cross-sectional view in FIG. 9, and bottom perspective views in FIGS. and 11, The lower reinforcing flap 106 may be configured to provide a sandwich connection to the rear edge 70 of the dump body in conjunction with the attachment portion 116 of the main extension flap 102. The lower reinforcing flap 106 may also be configured to provide underside support and stiffening to the central portion 118 of the main extension flap 102. As shown in FIGS. 10 and 11, the lower reinforcing flap 106 may include a core portion 126 in the form of a generally flat plate extending across the bottom portion 72 of the rear edge 70 of the bottom 60 of the dump body. The core portion 126 may have a width similar to, but slightly narrower than, the width of the central portion 118 of the main extension flap 102. That is, the core portion may have a width similar to the attachment portion 116 of the main extension flap 102. As shown in FIG. 9, the core portion 126 may include a flared forward edge 128 and an upward extending prop 130 at a rear edge. The flared forward edge 128 may help to guide the front edge of the tail extension 100 onto the rear edge 70 of the dump body during installation. The upward extending prop 130 may extend upward to and make contact with a bottom side of the central portion 118 of the main extension flap 102 and may, as such, function to stiffen the central portion 118 across its width. Additional lateral portions 132 may extend further laterally than the core portion 126 and may extend under the remaining width of the central portion 118 of the main extension flap 102. Still further, upturned side members 134 may be arranged outboard of the additional lateral portions 132. The upturned side member 134 may extend laterally from the additional lateral portions 132 and turn upward and extend along side the upward extending returns 120 of the main extension flap 102 and be welded or otherwise secured thereto.

Throughout the field defined by the core portion 126 of the lower reinforcing flap 106, several accommodating notches 136 or openings 138 may be provided. For example, at the forward edge of the lower reinforcing flap 106, one or more notches 136 may be provided to accommodate bottom stiffening structures on the dump body. In addition, access openings 138 may be provided in the lower reinforcing flap 106 to allow weld access during manufacturing of the tail extension 100. In particular, weld access to the stiffening system 108 between the main extension flap 102 and the lower reinforcing flap 106 may be provided by the openings 138. After assembly, covers 140 may be provided to cover the access openings 138 in the lower reinforcing flap 106. The lower reinforcing flap 106 may also include a plurality of fastener openings 142 that match the openings 122 in the main extension flap 102 and the dump body and are adapted to receive bolts to attach the tail extension 100. In one or more examples, spacers or stiffening bars 144 may be provided between the lower reinforcing flap 106 and the bottom surface of the dump body as shown in FIG. 9. In one or more examples, the spacers 144 may be secured to the dump body.

The stiffening system 108 may be arranged between the lower reinforcing flap 106 and the main extension flap 102 as shown in FIGS. 7 and 9. The stiffening system 108 may be configured to stiffen the main extension flap 102 by reducing the distance the flap may extend without support. As shown, the stiffening system 108 may include one or more inverted channels 146. The channels 146 may be arranged within the core portion 126 of the lower reinforcing flap 106 with the flanges of the channels 146 facing downward and the web of the channels abutting a bottom side of the main extension flap 102. As shown, the channels 146 may be cut an angle to accommodate the diverging angle between the lower reinforcing flap 106, which is parallel to the bottom 60 of the dump body and the central portion 118 of the main extension flap 102, which is canted upward as discussed above. Additional stiffeners 148 may be provided outboard of the core portion 126 of the lower reinforcing flap 106 and may be arranged between the additional lateral portion 132 of the lower reinforcing flap 106 and the outer portions of the central body 118 of the main reinforcing flap 102. Still other stiffeners may be provided.

The fastening system 110 may be configured to secure the tail extension 100 to the dump body by way of the attachment portion 116 of the main extension flap 102 and the core portion 126 of the lower reinforcing flap 106. As shown, fasteners 150 may extend through the holes 122 in the respective main flap 102 and reinforcing flap 106. In one or more examples, the fasteners 150 may be inserted from a bottom side such that the heads of the fasteners are below the lower reinforcing flap 106 and the threaded portions of the fasteners extend upward through the lower reinforcing flap 106, through the bottom 60 of the dump body, and through the attachment portion 116 of the main extension flap 102 where a threaded receiving element may he provided. That is, while a nut or other threaded receiving fastener may be provided, one or more examples may include a threaded block 152. A threaded block 152 may include a bar having a plurality of threaded bores in it for receiving multiple fasteners 150. As shown in FIG. 6 and in cross-section in FIG. 9, a pair of threaded blocks 152 may be provided extending across the width of the attachment portion 116 of the main extension flap 102. The threaded block 152 may be arranged such that its threaded bores align with the holes 122 in the attachment portion 116 and the threaded block may be welded or otherwise secured to the attachment portion 116. As such, when the tail extension 100 is slipped over the rear edge 70 of the dump body, fasteners 150 may be extended upward through the lower reinforcing flap 106, through the bottom 60 of the dump body, through the attachment portion 116 and into the threaded block 152. Still other approaches to attaching and detaching may be provided.

It is to be appreciated that removably attaching, removably attached, and similar terms should be considered to mean removable without tools or with tools such as those adapted for tightening, loosening, adjusting, or otherwise activating or deactivating fasteners. Suggestions that "anything can be removed" or "anything can be disassembled" are not within the scope of the terms listed, particularly where damage to the device being removed or to the thing the device is attached to would occur.

The wear resisting system 112 may include a wear enclosure for the threaded blocks and a wear bar 158 for the rear edge of the main extension flap 102. The wear enclosure for the threaded blocks 152 may include one or more barrier bars 154 that are arranged on each of one, two, three or four sides of the threaded block or blocks. In one or more examples as shown, the pair of threaded blocks 152 may define an area and the barrier bars 154 may be arranged to surround the front and sides the area defined by the threaded blocks 152. The barrier bars 154 may have a height that is the same or slightly taller than the threaded blocks 152. A cover plate 156 may be provided on top of the barrier bars 154. That is, the cover plate 156 may be sized and shaped to cover the threaded blocks 152 by reaching each of the barrier bars 154 on the front and sides of the threaded blocks 152 and resting on a threaded block 152 below the rear edge of the cover plate 156. The barrier bars 154 and cover plate 156 may be welded in place or otherwise secured around the threaded blocks 152 to fully, or partially, enclose the threaded blocks 152 and/or to protect the front, sides, and tops, of the threaded blocks 152. It is to be appreciated that in addition to protecting the threaded blocks 152, the wear resisting system 112 covering the threaded blocks 152 may also assist in protecting the central portion 118 of the main extension flap 102 and, in particular, the trailing edge thereof. That is, as material or debris slides, rolls, or tumbles rearward in the dump body, it may contact the wear resisting system 112 prior to the remaining aspects of the tail extension 100. This contact may slow the material down, stop it, or at least redirect it upward slightly before it contacts the central portion 118 of the main extension flap 102. This may lessen the impact on the central portion 118 of the main extension flap 102.

As mentioned, the wear resisting system 112 may also include a wear bar 158 for the rear edge of the main extension flap 102. As shown in FIGS. 9-11, the wear bar 158 may be arranged on an underside of the central portion 118 of the main extension flap 102 and may extend generally fully across the rear edge of the extension flap 102. The wear bar 158 may function to protect the rear edge of the extension 100 during dumping operations where material piling up behind the haul truck may flow back against the rear edge of the tail extension 100 or otherwise impact the rear edge of the tail extension 100. The barrier bars 154, the cover plate 156, and wear bar 158 may include relatively hard and/or wear resistant materials that may resist abrasive damage and/or impact damage from debris or material in the dump body.

Tie backs 114 may be provided on either side of the tail extension 100 as shown in FIGS. 3-6. The tie backs 114 may be welded or otherwise secured to a top or near top edge of the upward extending returns 120 of the main extension flap 102. When the tail extension 100 is installed, the tie backs 114 may extend along an outboard side of the sidewalls 64 of the dump body and may be bolted to the dump body. For example, the dump body may include internal threaded blocks with bores to be aligned with holes in the tie backs 114 and allowing for attachment of the tie backs 114 to the sidewalls 64 of the dump body.

INDUSTRIAL APPLICABILITY

Several advantages may be apparent from a review of the present disclosure. For example, the removable nature of the tail extension 100 may allow users to rely on the tail extension 100 in particular work conditions, but to remove it when it is not as useful or potentially not needed. That is, for high incline situations, a user may be able to add the tail extension 100 and then remove the extension 100 when less steep grades are anticipated. In addition, the sandwich connection 160 provided by the main extension flap 102 and the lower reinforcing flap 106 and shown in FIG. 9, may cause the fasteners to be in a double shear condition rather than a situation where the fasteners may be subject to prying action of a single plate. Still further, the "box" nature of the main extension plate 102 and the lower reinforcing plate 106 may function to strengthen the section and stiffen the extension 100. The thread blocks 152 for the fasteners may also be useful to help to avoid damage to fasteners that may otherwise have been installed from a top side. That is, with the fasteners installed from a bottom side, the heads of the fasteners may be protected, Moreover, the wear resisting system 112 that protects the thread blocks 152, may also increase the durability of the system by protecting the thread blocks 152, but also by protecting the main extension flap 102 from damage due to sliding, tumbling, or rolling debris as discussed above. The ribs 104 on the outboard sides of the main extension flap 102 may function to stiffen the upward extending returns 120 and may also function to close any gap between the upward extending returns 120 and the sidewall 64 of the dump body. Still further, the covers 140 on the bottom of the lower reinforcing flap 106 may protect against the intrusion of debris within the tail extension 100 which may add excess wait, cause abrasion or damage, or otherwise cause deterioration of the tail extension 100.

In operation and use, and as shown in FIG. 12, a method 200 of installing and/or removing a tail extension on a dumb body may be provided. As shown, the method may include slipping a tail extension over the rear edge of the dump body 202. The slipping operation may include suspending the tail extension and guiding the tail extension toward the dump body while adjusting the position of the tail extension to align the rear edge of the dump body with a gap between the main extension flap and the flared front edge of the lower reinforcing flap. The tail extension may also be adjusted side to side to align the tiebacks with the outboard edges of the dump body. The slipping operation may also include advancing the tail extension in a forward direction and aligning the holes in the tail extension with the holes in the dump body. Guide pins or other devices may be used to get the holes aligned. The method may also include removably attaching the tail extension to the dump body 204. In one or more examples, the removably attaching may include inserting fasteners into the holes in the bottom of the lower reinforcing flap and advancing them upward through the dump body and into the main extension flap. The method may include inserting the fasteners into the threaded bores of the thread blocks thereon and tightening the fasteners. The method may also include inserting fasteners through the tie-backs into the sidewalls of the dump body. A reverse operation may be performed to remove the tail extension 206.

The above detailed description is intended to be illustrative, and not restrictive. The scope of the disclosure should, therefore, be determined with references to the appended claims, along with the full scope of equivalents to which such claims are entitled.

What is claimed is:

1. An extension for a truck bed, comprising:
   a main extension flap configured to overlap a top surface of a bottom of the truck bed and extend rearwardly beyond a rear edge of the truck bed, wherein a portion of the main extension flap arranged beyond the rear edge comprises a stationary and upward sloping surface relative to the bottom of the truck bed; and
   a lower reinforcing flap configured for arrangement below the truck bed and extending rearwardly and upwardly to support and stiffen the main extension flap,
   wherein the main extension flap and the lower reinforcing flap are configured to form a removable sandwich connection on the rear edge of the truck bed.

2. The extension of claim 1, wherein the main extension flap comprises threaded blocks for receiving fasteners from below the truck bed.

3. The extension of claim 2, wherein the extension comprises a wear resisting system surrounding and enclosing the threaded blocks.

4. The extension of claim 1, wherein extension flap comprises an attachment portion for connecting to the truck bed and a central portion extending rearwardly therefrom.

5. The extension of claim 4, wherein the central portion is canted relative to the attachment portion to establish the stationary and upward sloping surface.

6. The extension of claim 5, wherein the main extension flap further comprises upwardly extending ends.

7. The extension of claim 6, further comprising tiebacks between the upwardly extending ends and the truck bed.

8. The extension of claim 4, wherein the lower reinforcing flap comprises a flared forward edge.

9. The extension of claim 4, wherein the lower reinforcing flap comprises a prop along a rear edge thereof, the prop configured to provide the support and the stiffening of the main extension flap.

10. The extension of claim 1, further comprising a wear resisting bar on an underside of a rear edge of the main extension flap.

11. A truck bed for a haul truck, comprising:
a bottom, a front wall, and a pair of sidewalls; and
an extension, comprising:
a main extension flap configured to overlap a top surface of the bottom of the truck bed and extend rearwardly beyond a rear edge of the truck bed, wherein a portion of the main extension flap arranged beyond the rear edge comprises a stationary and upward sloping surface relative to the bottom of the truck bed; and
a lower reinforcing flap configured for arrangement below the truck bed and extending rearwardly and upwardly to support and stiffen the main extension flap,
wherein the main extension flap and the lower reinforcing flap are configured to form a removable sandwich connection on the rear edge of the truck bed.

12. The truck bed of claim 11, wherein the main extension flap comprises threaded blocks for receiving fasteners from below the truck bed.

13. The truck bed of claim 12, wherein the extension comprises a wear resisting system surrounding and enclosing the threaded blocks.

14. The truck bed of claim 1, wherein extension flap comprises an attachment portion for connecting to the truck bed and a central portion extending rearwardly therefrom.

15. The truck bed of claim 14, wherein the central portion is canted relative to the attachment portion to establish the stationary and upward sloping surface.

16. The truck bed of claim 15, wherein the main extension flap further comprises upwardly extending ends.

17. The truck bed of claim 16, further comprising tiebacks between the upwardly extending ends and the truck bed.

18. A method of installing a tail extension on a truck bed, comprising:
slipping a tail extension over a rear edge of a bottom of the truck bed to sandwich the truck bed with a main extension flap and a lower reinforcing flap of the tail extension, wherein a portion of the main extension flap arranged beyond the rear edge comprises a stationary and upward sloping surface relative to the bottom of the truck bed;
inserting fasteners through the lower reinforcing flap, through the truck bed, and through the main extension flap into thread blocks on a top side of the main extension flap; and
tightening the fasteners.

19. The method of claim 18, wherein slipping the tail extension over the rear edge of the truck bed comprises adjusting the position of the tail extension to align a gap between the main extension flap and a flared front edge of the lower reinforcing flap with the rear edge of the truck bed.

20. The method of claim 19, further comprising securing tiebacks on the tail extension to the sidewalls of the truck bed.

* * * * *